(12) United States Patent
Holt (10) Patent No.: US 7,718,067 B2
(45) Date of Patent: May 18, 2010

(54) SEPTIC SYSTEM REMEDIATION METHOD AND APPARATUS

(75) Inventor: Karl K. Holt, Hartland, WI (US)

(73) Assignee: Aero-Stream, LLC, Hartland, WI (US)

( * ) Notice: Subject to any disclaimer, the term of this patent is extended or adjusted under 35 U.S.C. 154(b) by 394 days.

(21) Appl. No.: 11/914,902

(22) PCT Filed: May 19, 2005

(86) PCT No.: PCT/US2005/017681

§ 371 (c)(1),
(2), (4) Date: Nov. 19, 2007

(87) PCT Pub. No.: WO2006/126986

PCT Pub. Date: Nov. 30, 2006

(65) Prior Publication Data

US 2008/0185335 A1    Aug. 7, 2008

(51) Int. Cl.
*C02F 3/00* (2006.01)
(52) U.S. Cl. ............. 210/615; 210/620; 210/627; 210/760; 210/150; 210/220
(58) Field of Classification Search ......... 210/220, 210/150–151, 760, 620, 627, 615
See application file for complete search history.

(56) References Cited

U.S. PATENT DOCUMENTS

| | | | |
|---|---|---|---|
| 1,563,850 A | 12/1925 | Hartman | |
| 1,845,670 A | 2/1932 | Lebrun | |
| 3,365,383 A | 1/1968 | Blair | |
| 3,942,020 A | 3/1976 | Ciambrone | |
| 4,250,040 A | 2/1981 | LaRaus | |
| 4,386,055 A | 5/1983 | McBride | |
| 4,626,876 A | 12/1986 | Miyagawa et al. | |
| 4,970,056 A | 11/1990 | Wooten et al. | |
| 5,106,495 A | 4/1992 | Hughes | |
| 5,106,589 A | 4/1992 | Conrad | |
| 5,190,648 A | 3/1993 | Ramsauer | |
| 5,221,470 A | 6/1993 | McKinney | |
| 5,332,511 A | 7/1994 | Gay et al. | |
| 5,384,048 A | 1/1995 | Hazen et al. | |
| 5,422,043 A | 6/1995 | Burris | |
| 5,490,935 A | 2/1996 | Guy | |
| 5,549,818 A | 8/1996 | McGrew, Jr. | |
| 5,641,461 A | 6/1997 | Ferone | |
| 5,788,836 A * | 8/1998 | Davis | 210/139 |
| 5,810,514 A | 9/1998 | Suchecki, Jr. | |

(Continued)

FOREIGN PATENT DOCUMENTS

JP      10151480      6/1998

(Continued)

*Primary Examiner*—Chester T Barry
(74) *Attorney, Agent, or Firm*—Michael Best & Friedrich LLP (57) ABSTRACT

A method and apparatus for remediating a failing wastewater treatment system comprising a positive air, oxygen, ozone, or combination thereof, generating pressure pump (40) directing the air, oxygen, ozone or combination through a tube (50) to an air stone (60) suspended in the effluent. Attached growth bacteria grow on a plurality or random directional brushes (116) in an effluent tank, e.g., septic tank (14).

20 Claims, 6 Drawing Sheets

U.S. PATENT DOCUMENTS

| | | |
|---|---|---|
| 5,834,031 A | 11/1998 | Martin et al. |
| 6,096,203 A | 8/2000 | Drewery |
| 6,129,850 A | 10/2000 | Martin et al. |
| 6,159,371 A | 12/2000 | Dufay |
| 6,200,470 B1 | 3/2001 | Romero et al. |
| 6,217,833 B1 | 4/2001 | Kolu |
| 6,475,395 B1 | 11/2002 | Schmit et al. |
| 6,500,332 B2 | 12/2002 | Martin et al. |
| 6,511,638 B2 | 1/2003 | Matsuzaki |
| 6,780,318 B2 | 8/2004 | Fife et al. |
| 6,800,205 B2 | 10/2004 | Collins |
| 6,835,312 B2 | 12/2004 | Perriello et al. |
| 6,861,248 B2 | 3/2005 | Dale et al. |
| 6,863,818 B2 | 3/2005 | Daigger et al. |
| 6,942,800 B2 | 9/2005 | Jungbauer |
| 7,118,678 B2 | 10/2006 | Porat |
| 7,264,727 B2 | 9/2007 | Holt |
| 2002/0190404 A1 | 12/2002 | Baarda |
| 2003/0113908 A1 | 6/2003 | Hussey et al. |
| 2003/0234217 A1 | 12/2003 | Perriello et al. |
| 2005/0061738 A1 | 3/2005 | Holt |
| 2008/0023412 A1 | 1/2008 | Holt |

FOREIGN PATENT DOCUMENTS

| | | |
|---|---|---|
| JP | 11253942 | 9/1999 |

* cited by examiner

SEPTIC SYSTEM REMEDIATION METHOD AND APPARATUS

FIELD OF THE INVENTION

This invention relates generally to septic systems and to the components that make up such systems. More particularly, it relates to an improved method and apparatus for remediating the formation of a bio-mat that can occur in the absorption field component of a private on-site wastewater treatment system.

BACKGROUND OF THE INVENTION

Septic systems and septic system components are well known in the art. Such systems are typically found in relatively sparsely populated areas not otherwise serviced by municipal waste water systems. However, septic systems are also frequently used in developing countries even in very populous areas. In populous areas, the combination of high user loads and poor maintenance can lead to problems.

The purpose of a septic system is to dispose of the wastewater that is generated by the occupants of a home or other building in such a manner that surrounding soils can be used to disperse the wastewater without causing an adverse effect on ground water and, in turn, on public health and the environment in general. To accomplish this task, septic systems are normally comprised of a septic tank, a distribution system and a leaching system.

The septic tank is connected to the plumbing of a home or building by means of a sewer line. The septic tank provides a holding area for the settling of waste solids and for some initial treatment of the waste. Some septic tanks are constructed with porous walls and or bottoms with or without an outlet pipe. These tanks are commonly known as cesspools. These tanks provide a holding area for the solids and allow the liquids to flow through the porous walls and or bottom. This type of system provides both a means of accumulating solids (a tank) and the distribution of treated effluent (a seepage pit). Generally, septic tanks have baffles to slow the velocity of the liquid moving through the tank and to prevent solids from leaving the tank. In this way, properly functioning septic tanks produce an effluent of fairly uniform quality.

The effluent then moves to a distribution system that directs the flow of effluent from the septic tank to the leaching system in such a manner as to fully utilize the leaching system. Most systems take advantage of gravity, meaning that flow runs through piping and distribution boxes without the assistance of any mechanical device such as a pump.

The leaching system disperses the sewage effluent over a given underground area and into the surrounding natural soils. There are several types of leaching systems and the specific type used often depends on the surrounding soil conditions. Most residential leaching systems use stone filled leaching trenches but galleries, pits, and beds have also been used.

In the experience of this inventor, private on-site wastewater treatment systems have finite lifetimes due to many factors including household water use, excessive introduction of chemicals into the waste stream, poor maintenance, and environmental factors. Replacement of any septic system component that may be required to deal with remediation of the entire system can be extremely expensive. The reason for this is the fact that the septic system components, for the most part, are buried underground as previously described and are largely inaccessible.

A very significant factor is that passive septic systems typically rely on the presence of indigenous anaerobic bacteria to break down the solid waste introduced to the system. As solid waste enters the septic tank, it flows through the series of baffles that are designed to reduce the velocity of the flow as previously described. Generally, three identifiable layers occur in a septic tank. First, as designed, solid wastes precipitate out of the flow to the bottom of the septic tank. This layer is generally known as sludge. Liquid effluent is the intermediate layer and generally consists of liquids and solids partially broken down into liquids by the anaerobic bacteria that are present in the septic tank. This intermediate layer is drained off to the absorption field. The top layer in the septic tank is generally known as the scum layer. The scum layer is comprised of mostly residual detergents, soaps, fats and oils and has a tendency to float at the top of the septic tank. Optimally, the septic tank is designed such that only the partially treated liquid effluent is permitted to leave the septic tank for the absorption field. Unfortunately, this is not always the case.

The standard septic system is passive in that it relies on the presence of indigenous anaerobic bacteria to break down the solid wastes introduced into the system. Anaerobic bacteria thrive in conditions such as those that exist at the bottom of a septic system, where oxygen is lacking. Accordingly, septic systems are designed to have the capacity to treat a certain amount of solid wastes based on the capability of the indigenous bacteria to break down the solid waste over a certain period of time. Therefore, the average amount of solid waste produced per day should be approximately equal to the amount that the anaerobic bacteria can break down in one day.

Aerobic bacteria are also indigenous and occur naturally within the waste stream. Aerobic bacteria, however, exist and function only where oxygen is present. While aerobic bacteria typically break down solid wastes more quickly than anaerobic bacteria, they are ineffective at breaking down sludge, or the solid layer at the bottom of the septic tank, because there is no oxygen present in that layer. Due to increased installation and operating costs, aerobic systems that would otherwise eliminate this sludge layer are currently not favored for home use.

As anaerobic bacteria digest solids suspended in the effluent as they make their way to the absorption field or in the absorption field, the suspended solids and accompanying bacteria are then deposited at the interface between the absorption field and the soil surrounding the system. This layer is known as the "bio-mat" and it performs further filtering of the effluent. Unfortunately, the bio-mat layer can grow to a thickness where it almost completely, or almost completely, impedes absorption.

While there are many ways in which septic systems can fail, two of the most likely modes of failure include the creation and thickening of a bio-mat layer at the absorption field component of the system due to the decomposition of solids within the effluent. Excess sludge and scum from the septic tank can also build up in this bio-mat. For example, when the rate of decomposition caused by the anaerobic bacteria is incapable of keeping up with rate of solids draining into the system, the septic tank fills with sludge. As the sludge level gets higher, the scum level at the top of the tank takes up more space. This causes the liquid effluent to run through the septic tank more quickly, which prevents solids from settling. The solids that fail to settle in the septic tank proceed to the absorption system, where they frequently plug the pores in the soil used for absorption. The scum layer can also find its way out of the septic tank and similarly prevents soil absorption. If too much of the absorption field is plugged by scum and solids, the effluent will actually back up in the absorption area and cause muddy spots in the area above the absorption field. This is a sign that the absorption field has failed, an extremely malodorous and unsightly condition.

As alluded to earlier, replacement of soil absorption systems is frighteningly costly and heavily regulated by states, counties and municipalities due to the threat that malfunctioning systems pose to the groundwater. Replacement systems are very expensive, with the actual expense depending on the condition of other components in the septic system. Some owners choose to convert their existing passive system to an active system, an even more costly endeavor. Another possible option is to create an above-grade soil absorption system. Above grade systems also have operating and maintenance expenses and those are even greater than passive systems. Holding tanks are frequently the option of last resort as they are also expensive and need to be regularly pumped by a commercial contractor.

Frequently, a failing or failed soil absorption system can be remediated with the support of naturally occurring aerobic bacteria in the system. In theory, an aerobic system could eliminate or substantially reduce the failure rate of an absorption field. Unfortunately, aerobic bacteria also require the introduction of oxygen into the waste stream. This inventor has previously identified a need for a temporary means for introducing oxygen into a failed or failing soil absorption field for the purpose of converting the biochemical process from an anaerobic one to an aerobic one. In published U.S. patent application Ser. No. 10/764,245, this inventor disclosed that a forced introduction of oxygen into the system would allow the aerobic bacteria to scour the bio-mat, thereby working to reduce the thickness and/or increase the permeability of the bio-mat and permit the system to revert back to an anaerobic passive system as originally designed. There is also a need to alter the biochemical process by conversion of the complete soil absorption component or a localized area of it.

This inventor has also found that the forced introduction of ozone gas can improve performance of the remediation process disclosed above. U.S. patent application Ser. No. 10/930,148 discloses the use of ozone for septic system remediation. Ozone, also known as triatomic oxygen or $O_3$, is itself a powerful oxidizing agent. In nature, ozone is created when the electrical current of lightning transforms diatomic oxygen molecules, or $O_2$, into activated triatomic oxygen, or $O_3$. Ozone, however, is also an unstable gas which, at normal temperatures and under all ordinary conditions, spontaneously decomposes to diatomic oxygen or $O_2$. This decomposition is speeded by solid surfaces and by many chemical substances. For this reason, ozone is not encountered except in the immediate vicinity of where it is formed. That is, ozone cannot be stored and must be generated on-site. When ozone is introduced into the system, some of the highly oxidizing agent decomposes bio-degradable matter in the system. The balance of the available ozone rapidly decomposes to oxygen and is available for consumption by the aerobic bacteria.

One significant problem with the above disclosed methods is that the air and or oxygen or ozone introduced into the system simply bubbles to the surface of the tank. Additionally, microbubbles are required for optimum growth of bacteria. Normally, air bubbles emitted in a liquid medium combine to form larger bubbles. Therefore, what is needed is a means for retaining suspended oxygen microbubbles in the tank to increase the growth of aerobic bacteria and thus the remediation of the septic system. Also, providing a concentrated oxygen environment in the area of attached growth aerobic bacteria will allow the bacteria to further clean the wastewater and thus the remediation of the septic system.

BRIEF SUMMARY OF THE INVENTION

Accordingly, the present invention provides an improved apparatus and a method for the remediation of failing private onsite wastewater treatment systems, such systems being comprised of a septic tank having an inlet and an outlet, in some cases, a septic tank constructed with porous walls and or bottoms with or without an outlet pipe in some cases, a second septic tank or pumping chamber having an inlet and an outlet and a seepage pit, drywell, absorption field or a above grade mound system having an inlet and a plurality of outlets wherein effluent drains from the inlet to the outlet. The apparatus, in its most simple form, comprises (a) a positive pressure pump delivering air, oxygen, ozone, or a combination thereof to a an output, (b) a tube having a first end and a second end, the first end being attachable to the pump output, (c) an air stone attachable to the second tube end, the air stone being suspended in the effluent to allow emission of bubbles on all sides of the air stone and (d) a plurality of random directional brushes in the effluent tank such as a septic tank, potentially suspended over the air stone. The pump is used to deliver air, oxygen, ozone, or a combination thereof, through the tube to the air stone. As much tube as is required is used to allow the air stone to be introduced into almost any portion of the wastewater treatment system so as to introduce air into the effluent and allow aerobic bacteria to proliferate. The apparatus of the present invention could also include a plurality of such pumps, tubes and air stones and brushes, and in many combinations and locations in a septic system.

The brushes can potentially be a natural material, such as coconut fiber, or an artificial material such as polypropylene, among other things. The brushes are suspended in the effluent, preferably over the air stone such that as the bubbles rise, they are captured by the brushes, which provides for greater oxygen retention within the effluent tank and thus greater production of aerobic bacteria.

The present invention also provides an improved method for remediating failed or failing private onsite wastewater treatment systems wherein an accumulation of bio-mat has reduced the flow of effluent through the dry well or the absorption field minimally comprising the steps of (a) introducing air, oxygen, ozone, or a combination thereof, to the bio-mat or one of the effluent tanks, or septic tanks, (b) retaining oxygen in the septic tank through the use of oxygen retaining brushes, (c) introducing live aerobic bacteria to the bio-mat, (d) retaining monitoring the level of effluent in the absorption field or dry well, and (d) stopping the introduction of air and or oxygen and ozone, or ozone only, to the effluent when the bio-mat is sufficiently reduced or made permeable. The improved method of the present invention could also include introducing anaerobic, facultative or aerobic bacteria to the treated area before, and or during and or after the remediation equipment is removed.

Although the present invention refers to the term "brushes" in connection with the oxygen retaining apparatus to be inserted within the septic tank, in reality, any manner of oxygen retaining apparatus would be effective. Examples may include devices with multiple bristles that sink within an effluent tank, whether they are weighted devices or devices that naturally sink within effluent. The present invention can employ both natural and artificial materials to retain oxygen, although use of natural materials may be preferable as natural material may be more readily biodegradable when exposed to air and sunlight outside of the tank, such as a landfill and thus, environmentally friendly. Additionally, some natural materials may have more oxygen retaining ability as they tend to contain pores and other imperfections more likely to trap oxygen. The oxygen retaining apparatus may further be attached to a floating device within the effluent tank, or mechanically suspended to maintain the oxygen retaining apparatus at a predetermined level.

The foregoing and other features of the improved method and apparatus of the present invention will be apparent from the detailed description that follows.

BRIEF DESCRIPTION OF THE DRAWINGS

FIG. 1 is a perspective view of a typical private wastewater treatment system of the type that the method and apparatus of the present invention could be used with.

DETAILED DESCRIPTION

Figure 1:
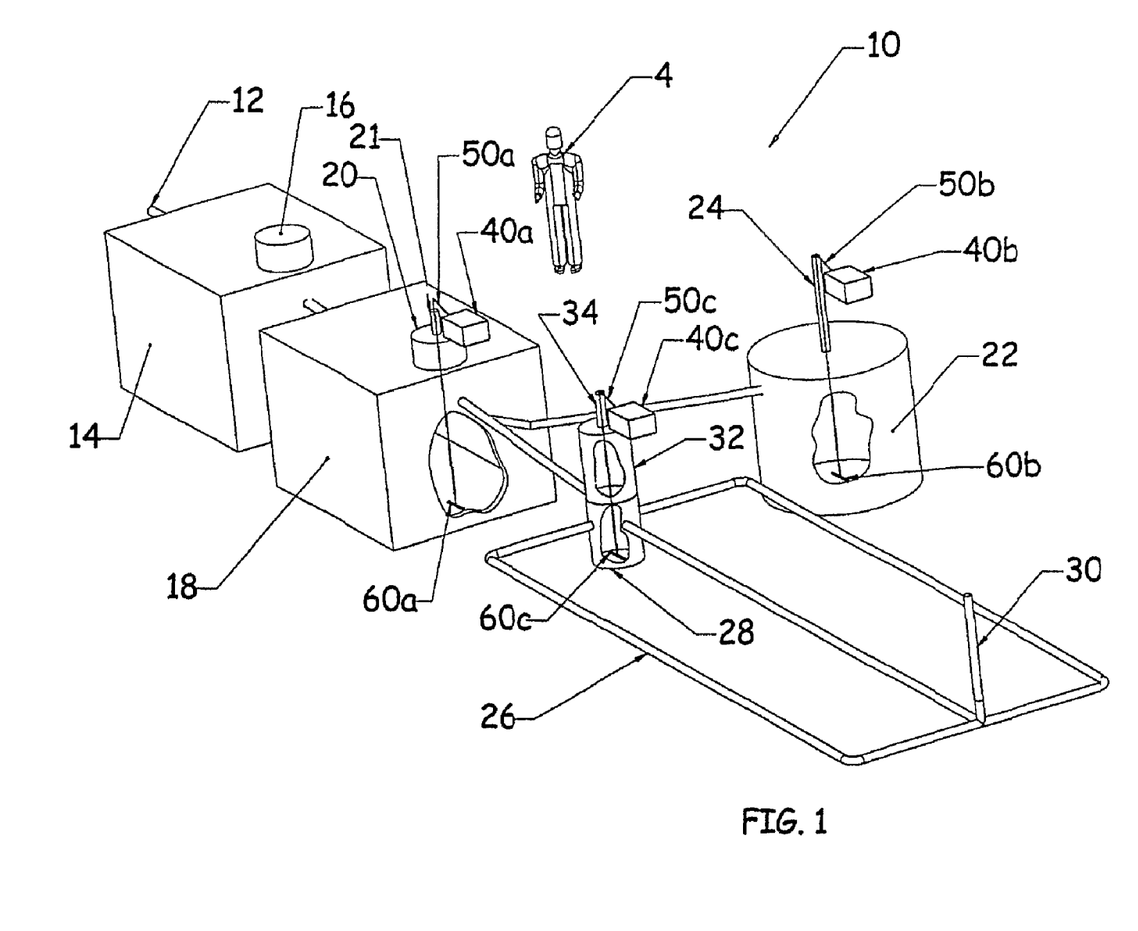

Reference is now made to the drawings wherein like numbers refer to like elements throughout. FIG. 1 illustrates a septic system, generally identified 10, with which the improved apparatus and method of the present invention is intended to be used. It is to be understood, however, that the precise configuration of the improved system is not a limitation of the present invention and could assume any number of sizes and layouts. The septic system 10 shown is for illustration purposes only. A six foot tall man 4 is included for relative size reference as well.

Figure 3:
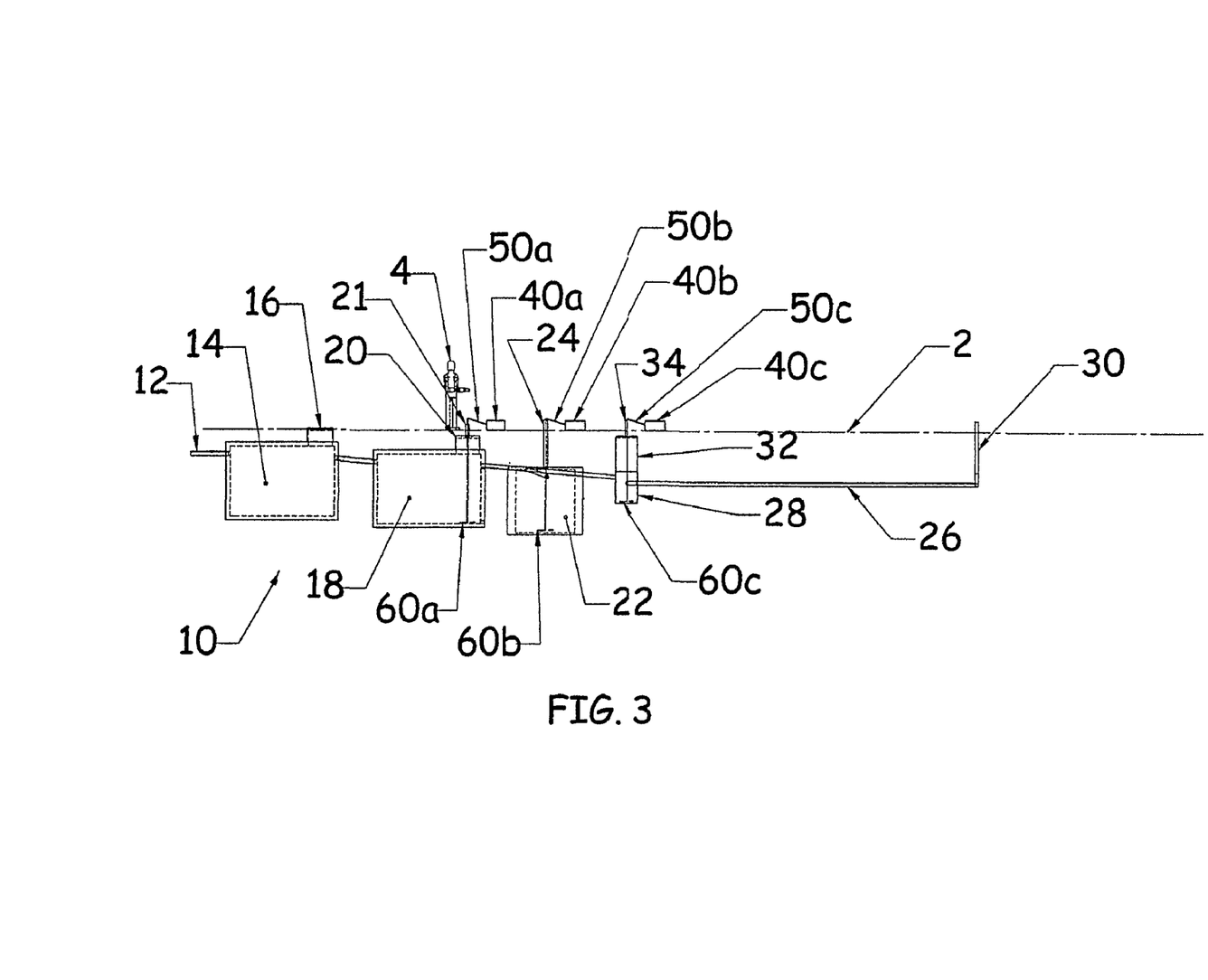
FIG. 3 is a side elevational view of the system shown in FIG. 1.

As shown in FIG. 3, the septic system 10 lies, for the most part, below earth grade 2. The system 10 includes a pipe 12 leading from a home or building (not shown) which pipe 12 is connected to a first septic tank 14. The first tank 14 may or may not have a vented cover. As shown, the first tank 14 includes a riser 16. The first tank 14 is, in turn, connected to a second tank 18. This second tank 18 may or may not have a vented cover as well. As shown, the second tank 18 includes a riser 20 and a vent 21. As will become apparent later in this detailed description, if either the first or second tanks 14, 18 do not have a vented cover atop of the risers 16, 20, respectively, one may need to be added in order to utilize the apparatus of the present invention. This second tank 18 may also be a pumping chamber. It should also be noted that the second tank 18 lies slightly below the first tank 14 such that gravity affects a downstream flow of effluent from one tank to the other.

The second tank 18 is, in turn, connected to a dry well or seepage pit 22. The dry well or seepage pit 22 includes a vent 24. An alternate to a dry well or seepage pit 22 is an absorption field 26 or an above grade mound system (not shown). The absorption field 26 may include a distribution box 28 and a vent 30. The distribution box 28 of the absorption field 26 may or may not include a distribution box riser 32 and a distribution box vent 34. Again, for reasons that will become apparent later in this detailed description, a distribution box riser 32 will likely need to be added to the system 10 if one is not already included. As shown in FIG. 3, it will be shown that the downward flow of effluent is affected by gravity. Alternatively, the effluent can be moved by a positive pressure pump to the soil distribution component of the system 10.

Figure 4:
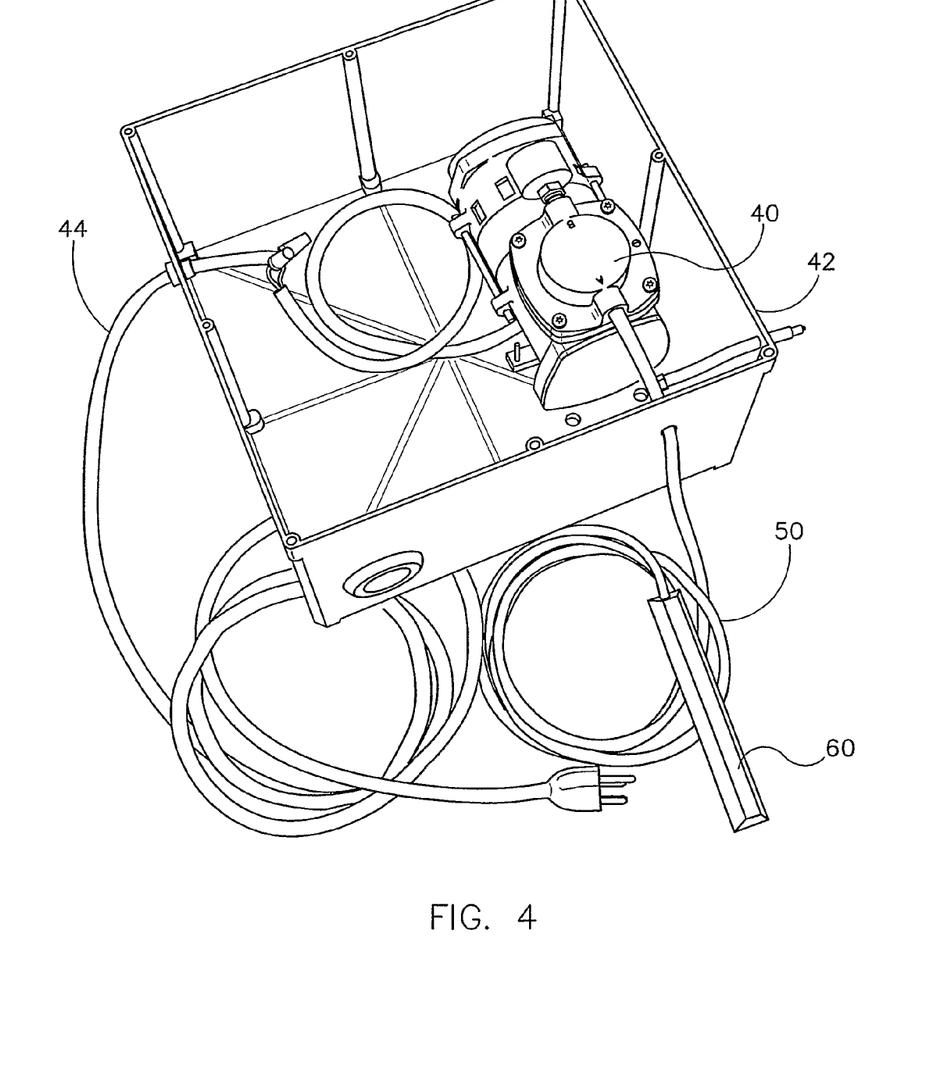
FIG. 4 is a photograph illustrating the components of an apparatus constructed in accordance with the present invention.

In general, the improved apparatus of the present invention is comprised of at least one high volume air pump or ozone generating pump 40 connected to at least one low pressure drop sintered air stone 60. The air stone 60 has a relatively large surface area. See FIG. 4. The pumps 40 and all internal electrical connections are packaged in a weatherproof container 42. The external electrical connection 44 is connected via an extension cord to a circuit breaker or may be permanently hardwired to an electrical junction box. The pumps 40 force air, oxygen, ozone, or a combination thereof, into clear vinyl tubing 50, although many types of tubing are acceptable and would be within the scope of the present invention. The tubes, or aeration lines, 50 are then connected to the air stones 60, which are placed at various locations inside the septic system 10. It is to be understood that at least one high volume air and or oxygen or ozone-generating pump 40 be utilized to introduce ozone into the system. Other pumps 40 may be used with or without ozone-generating capabilities.

Figure 2:
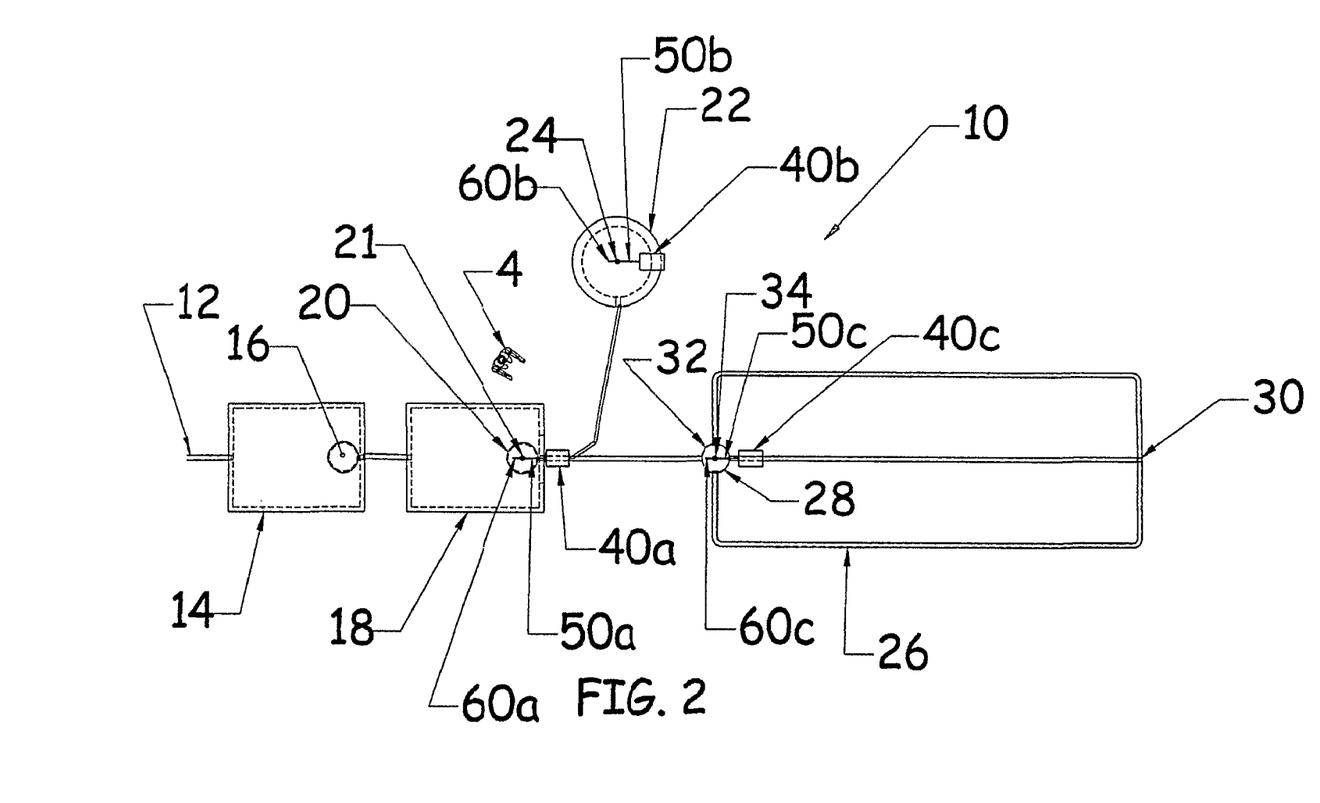
FIG. 2 is a top plan view of the system illustrated in FIG. 1.

As shown in FIG. 1, and using the improved system illustrated therein as representative of a typical system, the preferred location for the aeration lines 50 is in the vent pipe 34 of the distribution box 28, the vent pipe 24 of the dry well 22, or the vent pipe 21 of the second tank or pumping chamber 18. For example, as shown in FIGS. 1, 2 and 3, a first pump 40a, tubing 50a, and air stone 60a are used with the second tank 18. At that location, the first air stone 60a and a portion of the tubing 50a are inserted into the second tank 18 via the tank vent 21. A second pump 40b, tubing 50b, and air stone 60b are used with the dry well or seepage pit 22. And a third pump 40c, tubing 50c, and air stone 60c are used with the distribution box 28 of the absorption field 26. If the standing effluent level in the distribution box 28 is not of adequate depth, an alternate location should be considered. If a vent pipe or well is not available at this location, one may be installed for a rather nominal cost. In most cases, the standard vent cap can be used during remediation.

Figure 6:
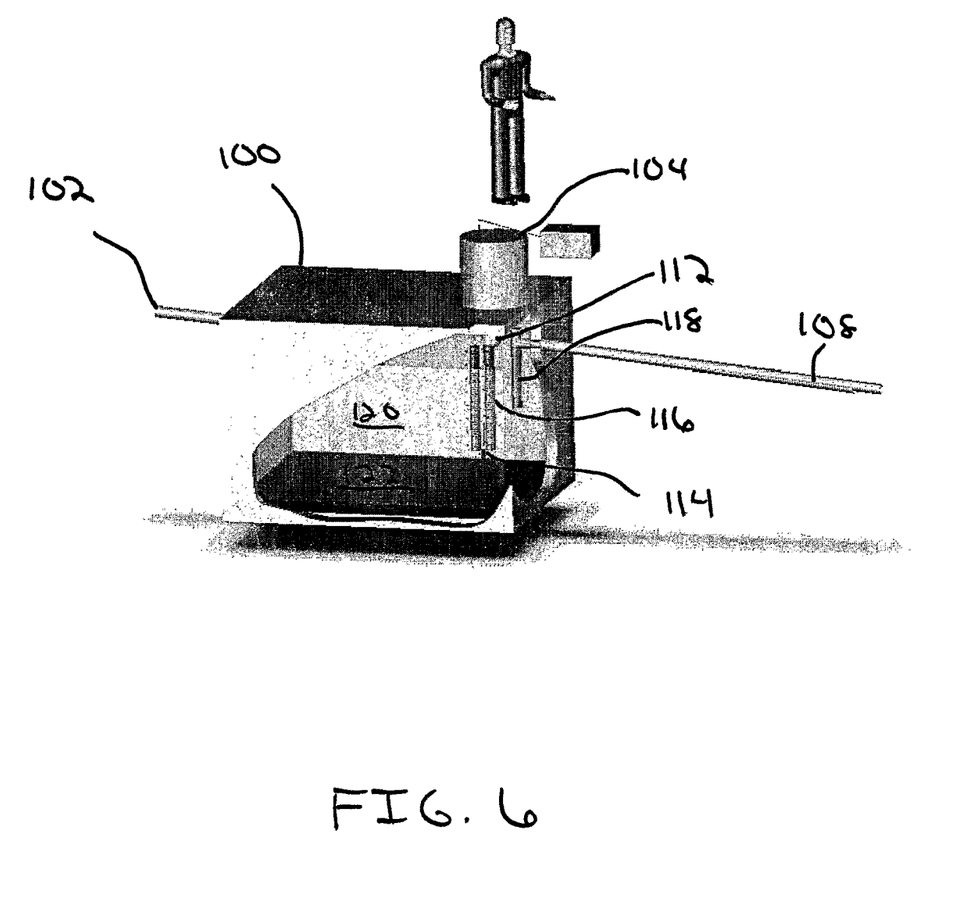
FIG. 6 is a side cross-sectional view of the septic system showing the present invention.

Referring now to FIG. 6, which shows a cutaway view of the present invention. More specifically, FIG. 6 shows a septic tank 100 having an inlet pipe 102 and an outlet pipe 108 and a riser 104 such as shown in FIG. 1. However, FIG. 6 also shows the unique oxygen or ozone retaining apparatus of the present invention. Specifically, the present invention provides for suspending the air stone 114 using a float 112 in the aerobic clear zone 120 above the sludge 122. The float 112 permits the air stone 114 to emit bubbles from all sides into the aerobic clear effluent area 120 instead of resting on the sludge layer 122. Suspended in the clear area 120 above the air stone 116 are the brushes 116. The brushes 116 slow the flow of the air, oxygen or ozone bubbles upwardly which provides more time for increased oxygen availability for the aerobic bacteria.

The brushes 116 may be fabricated from synthetic polymeric materials such as polyvinyl, chloride, polyurethane, polyethylene, nylon and the like. Although such materials are available, natural materials, such as coconut fibers, are preferred. The brushes 116 having natural fibers of random length, shape, sectional area, texture. This randomness provides for a brush that, in general, tends to retain more oxygen than the synthetic fibers.

In general, there are three types of aeration treatment units. There are suspended growth units, attached growth units, or a combination of the two. Suspended growth units are the most used aerobic units. Suspended growth units consist of an aeration chamber where air is mixed with wastewater. The aeration chamber contains a pump or a compressor to bring into the wastewater so it can be used by the bacteria. The bacteria are kept in suspension in the aeration chamber, and air is mixed with the effluent. The bacteria digest the solids in the wastewater or effluent and turn it into new bacteria cells, carbon dioxide, and water.

Attached growth units treat wastewater by providing a surface for bacteria growth. The bacteria-covered surface is introduced to the wastewater and the air alternately. These units sometimes contain fixed or floating cylinders or spheres that move around in the wastewater. Pretreatment is required for attached growth units. An advantage to attached growth units is that there is no mixing of air in the wastewater. The present invention takes advantage of both methods. The present invention provides for suspended growth in that all of the oxygen is not captured by the attached growth brushes. Additionally, attached growth is the growth provided for on the brushes.

In general, the brushes 116 are suspended via a float 112 in the air stream above the air stone 114. When the bubbles in the air stream make contact with the brushes and the aerobic bacteria, the bubbles break apart or adhere to the bristles and the aerobic bacteria. This oxygenation of the clear area 120 of the effluent allows the aerobic bacteria to thrive and multiply. The brushes 116 do not need to be in any particular shape or size although it is preferable to provide for a brush 116 which provides a large surface area such that it can capture and contain more oxygen within the bacteria so as to support the growth of more aerobic bacteria.

Brushes 116 may also be used to filter the clear effluent 120 as the clear effluent 120 rises through the outlet baffle 118 to the drainfield pipe 108. The brushes 116 in this location provide an area for attached growth aerobic bacteria directly in the path of the effluent flowing from the tank to the field, thus further cleaning the wastewater. The brushes 116 help to prevent the flow of solids into the drainfield (not shown) that could potentially damage the drainfield. Therefore, the outermost dimension of the bristles forming the outer margin of the brush 116 is preferably slightly larger than the expected interior dimension of the chamber or pipe into which the filter is installed.

It is to be understood that the improved apparatus of the present invention could be installed in alternate locations. For example, the aeration lines could be installed in the final septic tank or pumping chamber of a multiple tank system 10 or in the septic tank in a single tank system immediately prior to the outlet to the soil absorption system 10. As an alternate to installing through a vented cover, small holes can be drilled through the lid of the tank or compartment and the aeration lines installed. Installation of an approved effluent filter or a bristled filter brush is recommended with this application method.

Remediation is a lengthy process. However, the improved method and apparatus of the present invention provides some degree of immediate relief. Thereafter, the rate of remediation tapers off over time. Substantial remediation can occur in most systems 10 within about 6 months, although other systems 10 may require as long as one year. If, even then, the system is not completely remediated, the equipment can be operated for longer periods without detrimental effects to the system 10. One advantage to the use of at least one ozone-generating pump 40 within the system 10 is that the application of ozone to any medium, liquid or gas, does not add other chemicals to the system 10.

Depending on conditions, the introduction of ozone, approved bacteria, enzymes and vitamins may expedite the remediation process. Unfortunately, after the remediation equipment has been removed, there will be a lag of decomposition activity while the aerobic bacteria die and the anaerobic bacteria again take over. Many types of bacteria are available for purchase which include aerobic, anaerobic, facultative or a combination thereof that can expedite the system's return to normalcy. Addition of these products is not required in the improved method of the present invention but may be considered to enhance performance.

In the experience of this inventor, the length of time required to remediate a failing or failed absorption field depends on several factors, including, but not limited to, system type, size, severity of failure, site conditions, precipitation, and the average temperature during the remediation process. Several trials have been conducted that show the influences of these conditions. All trials showed successful application of the remediation program. The trials showed little change in measured effluent in the absorption system during the first several days of remediation. The following weeks showed a significant drop in effluent levels. Over time, the rate of effluent reduction decays. Rapid effluent drop near the top of the absorption system is to be expected as it is not normally used until the lower levels become plugged and the effluent levels begin to rise. Daily specific hydraulic loading and local precipitation had similar effects on all systems.

In another particular application, the present invention provides for use of one Enaly OZX-1000U ozone generator 40, two 12 inch Micro-Bubble air stones 60, 20 feet of tubing 50, a pair of "tees", one tube weight, a weatherproof container 42, an extension cord 44 and a UL rated ground fault circuit interrupter, or GFCI. See also FIG. 4. All electrical connections for the generator 40 are located inside the weatherproof container 42. An extension cord runs to a GFCI and then to the power source. The generator 40 used in this embodiment of the invention provides an ozone output of 1000 mg/hour with a pump output of 4 to 5 liters per minute, although other generators of various output capacities could be used. Other sizes and types of tubing 50 would also work equally well. Additionally, several types of air stones 60 other than that specified will work. The air stones 60 are attached to the end of the tubing 50 and distribute ozone more effectively to wet areas. It would also be possible to achieve favorable remediation by using a combination of air pumps and ozone generators 40, which combination would still come within the scope of the present invention.

In the opinion of this inventor, installation of the improved device of the present invention is relatively simple and straightforward and can frequently be accomplished by the homeowner. The user should first identify the components of his or her particular septic system. Frequently, the local government or health department will have information about the homeowner's septic system on file. However, as a general rule, home septic systems are comprised of a pipe running from the house to the septic tank, in some cases, a pipe running to a second septic tank or pumping chamber, and a typical distribution box that splits the effluent into several pipes going into the absorption field, as discussed above. With this configuration, there are several different locations in which the improved apparatus of the present invention can be installed to eliminate excess bio-mat. The preferred location to install the remediation equipment is as close to the bio-mat problem as possible. Therefore, in a septic system having a first septic tank 14, a second septic tank or pumping chamber 18, a dry well 22 and a distribution box 28 leading to one or more absorption field vents 30, 34, the preferred location would be in the dry well or seepage pit 22. A secondary, but still beneficial location would be to install the aerator stone 60 in the distribution box 28. However, it would also be beneficial to install the aerator stone 60 of the present invention after the second septic tank 18. Obviously, different septic systems will require different installations and this invention is not limited to any particular system.

In the event that a septic system 10 does not have a vent at a convenient location to monitor the progress of the remediation method, a monitoring well can be added to a conventional soil absorption system by driving a "sandpoint" well point not less than 12 inches and not more than 24 inches below the bottom of the soil absorption vent pipe 30. The bottom of the "sandpoint" should be driven to the bottom of the soil absorption field 26. Therefore, the effluent level in the "sandpoint" can then be monitored.

Figure 5:
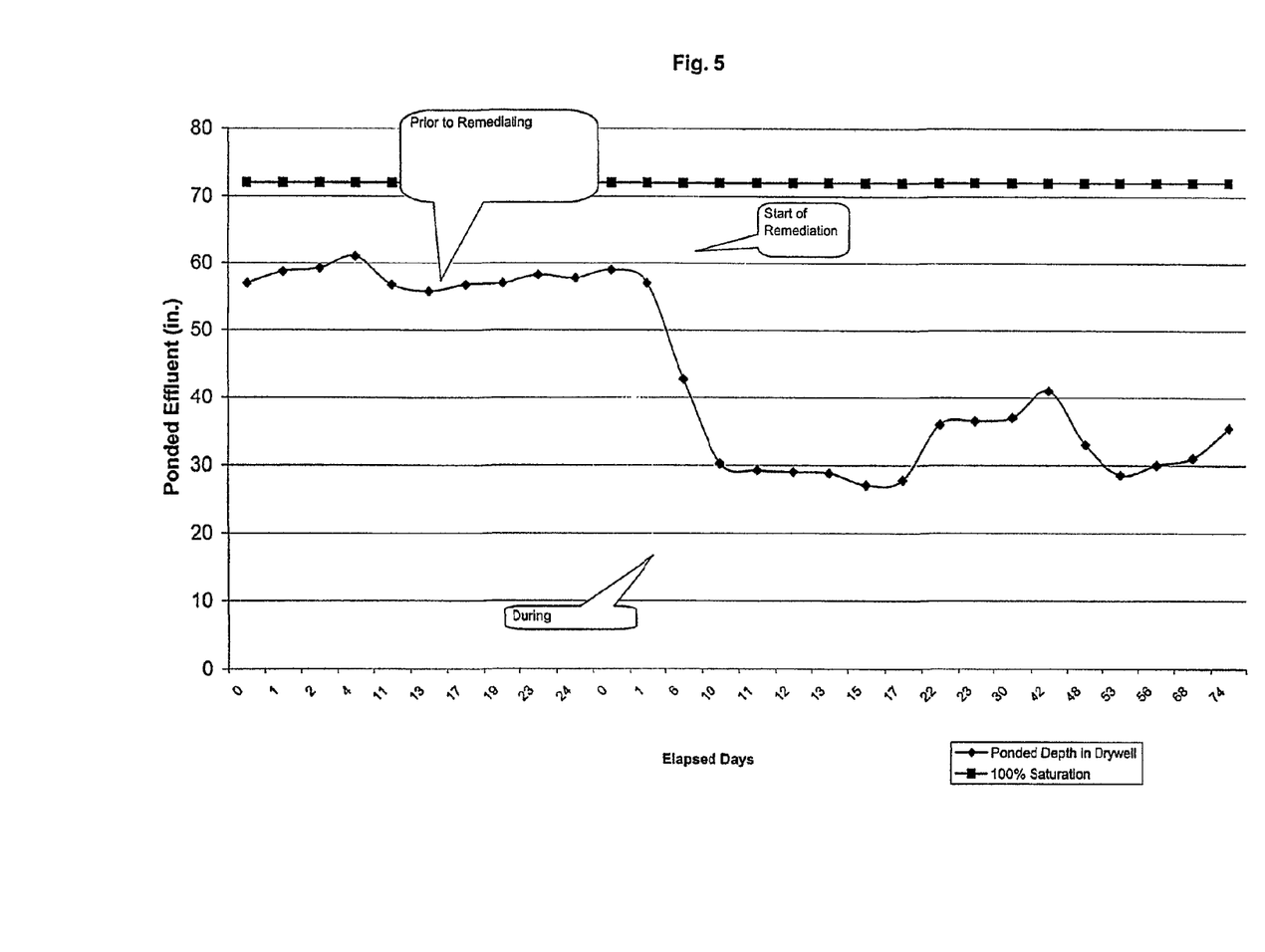
FIG. 5 is a graph illustrating ponded effluent depth versus elapsed time in a typical application using the method and apparatus of the present invention.

The improved remediation apparatus of the present invention should be allowed to operate for six months. If the system 10 is severely plugged, the equipment can operate for more time without damaging the septic system. The depth of the ponded effluent should be recorded regularly. Frequently, plotting the data on a program such as Microsoft® Excel will enable the user to predict the amount of time required for remediation. A good estimate of the required operating time can be obtained by examining a plot of the Ponded Effluent Depth as shown in FIG. 5. Normally, treatment should continue for two months after the ponded effluent depth stabilizes. For the system plotted in FIG. 5, the owner of the septic system might expect to operate the system a total of 120 days. The user should expect some anomalous measurements during the remediation period. For example, in FIG. 5, the ponded effluent depth in the septic system declined for several days, remained steady, and then rose again. This rise could be attributed to many things such as increased water usage and precipitation.

This improved process and apparatus can also be applied to the effluent contained in a holding tank. In this application, the effluent category can be changed from untreated waste to treated waste. This recategorization may reduce the pumping cost associated with the holding tank. Typically, untreated waste of a holding tank must be disposed of in a waste treatment facility. The waste treatment facility charges the waste hauler for this service, who in turn charges the owner of the holding tank. Treated waste can be alternatively distributed into the surface of the ground at less cost.

Yet another application of this improved process and equipment is in mobile and portable holding tanks. Mobile and portable holding tanks can be found in, but are not limited to recreational vehicles, camping trailers, boats, etc. These holding tanks are anaerobic in nature and emit odorful methane gases. Owners typically add chemical odor controllers containing paraformaldehyde, alkyl dimethyl benzyl ammonium chloride (quaternary ammonium) or other disinfectants. These chemicals are toxic and detrimental to a private on-site wastewater treatment system 10. Many rural campgrounds are serviced by a private on-site wastewater treatment system 10. Many campgrounds discourage or have banned the use of these additives. As alluded to earlier, the application of ozone to any medium does not add any other chemicals. In this application, the naturally occurring aerobic bacteria can eliminate the odors of a blackwater or sewage holding tank. In fact, ozone in its gaseous state is a proven deodorizer for a variety of odorous materials. Ozone also has the proven ability to convert biorefractory organic materials to biodegradable materials. Thus, ozone oxidation can produce wastewater with lower concentrations of problematic organic compounds. The equipment will keep the holding tank significantly free of sludge build up on the sidewalls and depth sensors. Application of this improved process to the gray water holding tank will also eliminate odor, keeps the holding tank free of sludge build up on the sidewalls and depth sensors. This treated gray water is then suitable for the use of flushing the toilet.

Based on the foregoing, it will be apparent that there has been provided an improved apparatus and method for introducing and retaining oxygen and ozone, or ozone only, into the effluent layer of a septic tank by suspending an oxygen delivering device in the effluent and providing for an oxygen retaining mechanism such as a series of brushes or similar large surface area devise that provide surface area upon which bubbles form, which, in turn provides for a larger source of oxygen for aerobic bacteria for the converting the biochemical process from an anaerobic one to an aerobic one. The forced introduction of air, oxygen, ozone, or a combination therof, into the system allows the aerobic bacteria to scour the bio-mat, thereby working to reduce the thickness of the bio-mat and permitting the system to revert back to an anaerobic passive system as originally designed. By using the improved method and apparatus of the present invention, the biochemical process is altered by complete or localized conversion of the soil absorption component as above described. The improved apparatus of the present invention may seem quite simple in practice compared to existing aerobic systems. However, the goal of this improved approach to remediation is value based. The idea is to provide an inexpensive and effective alternative to replacing the absorption system of a septic system. This has been accomplished by the improved method and apparatus of the present invention.

What is claimed is:

1. A wastewater treatment apparatus for the remediation of a wastewater treatment system, such wastewater treatment system being comprised of at least one septic tank, the septic tank having at least a lower sludge layer and an upper effluent layer, the septic tank further having an outlet to a distribution system and a leaching system, wherein effluent drains from the tank outlet through the distribution system and to the leaching system; the wastewater treatment apparatus comprising:
    at least one positive pressure generating pump having an output;
    a plurality of brushes, the brushes being situated within the liquid effluent in a septic tank;
    a tube having a first end and a second end, the first end being attachable to the pump output;
    an air stone attachable to the second tube end, said air stone being used to introduce air into the effluent and encourage aerobic bacteria to proliferate;
    a plurality of brushes providing a platform for attached growth within the effluent layer.

2. The apparatus of claim 1 further comprising the use of one or more ozone generating devices instead of or in combination with one or more air pumps.

3. The apparatus of claim 2 wherein the plurality of pumps, tubes and air stones are distributed at different locations throughout the system.

4. The apparatus of claim 1 wherein the air stone comprises a low pressure drop sintered air stone having a relatively large surface area.

5. The apparatus of claim 1 wherein the at least one pump is electrically actuated and includes internal electrical connections that are packaged within a weatherproof container.

6. The apparatus of claim 1 wherein the tubing is made from a vinyl material.

7. The apparatus of claim 1 further comprising means for introducing one or more from a group consisting of anaerobic bacteria, aerobic bacteria, facultative bacteria, enzymes and vitamins to the system.

8. The apparatus of claim 1 wherein the apparatus is utilized with at least one holding tank.

9. The apparatus of claim 1 wherein the apparatus is utilized with at least one mobile and/or portable holding tank.

10. The apparatus of claim 1 wherein the brushes are suspended within the septic tank in the effluent above the air stone.

11. The apparatus of claim 1 wherein the air stone is suspended within the septic tank in the effluent below the brushes, but above the sludge layer.

12. A method for the remediation of a wastewater treatment system, such system being comprised of at least one septic tank having an outlet, or one septic tank with porous walls and or bottom without an outlet pipe, a distribution system and a leaching system, wherein liquid effluent drains from the tank outlet through the distribution system and to the leaching system, comprising the steps of:
   providing at least one positive pressure air or ozone generating pump having an output;
   providing a tube having a first end and a second end, the first end being attachable to the pump output;
   providing an air stone that is attachable to the second tube end;
   introducing the air stone into a portion of the system containing liquid effluent;
   suspending one or more brushes in the liquid effluent to create a surface area for attached growth of aerobic bacteria; and
   delivering air or ozone through the tube into the effluent via the air stone to encourage aerobic bacteria to proliferate therewithin.

13. The method of claim 12 wherein the plurality of pumps, tubes and air stones providing steps include distributing the plurality of such pumps, tubes and air stones at different locations throughout the system.

14. The method of claim 12 wherein the air stone providing step includes providing a low pressure drop sintered air stone having a relatively large surface area.

15. The method of claim 12 wherein the pump providing step includes providing a pump that is electrically actuated and includes internal electrical connections that are packaged within a weatherproof container.

16. The method of claim 12 further comprising the step of introducing one or more from a group consisting of anaerobic bacteria, aerobic bacteria, facultative bacteria, enzymes and vitamins to the system.

17. The method of claim 12 wherein the method is adapted for use with at least one holding tank.

18. The method of claim 12 wherein the method is adapted for use with at least one mobile and/or portable holding tank.

19. A method for remediating a wastewater treatment system, such system being comprised of at least one septic tank having an inlet and an outlet or one septic tank with porous walls and or bottom without an outlet pipe, and at least one absorption field wherein effluent drains from the tank outlet, wherein an accumulation of bio-mat has reduced the flow of effluent through the absorption field, comprising the steps of:
   introducing a combination of ozone and air to the bio-mat;
   introducing one or more brushes to provide for attached growth of aerobic bacteria in the liquid effluent;
   introducing live aerobic bacteria to the bio-mat;
   monitoring the level of effluent in the absorption field; and
   stopping the introduction of ozone and air to the effluent when the bio-mat is sufficiently reduced or made permeable.

20. The method of the claim 19 further comprising the step of introducing live anaerobic bacteria to the system after stopping the introduction of ozone and air to the system.

* * * * *